United States Patent [19]

Gamay

[11] Patent Number: 5,167,977

[45] Date of Patent: Dec. 1, 1992

[54] PROCESS FOR PRODUCING LOW FAT MEAT PRODUCTS

[76] Inventor: Aly Gamay, 4020 S. Avon Dr., New Berlin, Wis. 53132

[21] Appl. No.: 813,317

[22] Filed: Dec. 24, 1991

[51] Int. Cl.$^5$ ............................................. A23L 1/31
[52] U.S. Cl. ................... 426/417; 426/480; 426/646
[58] Field of Search ............... 426/417, 646, 478, 480, 426/490, 495; 260/412.6

[56] References Cited

U.S. PATENT DOCUMENTS

| | | | |
|---|---|---|---|
| 3,013,887 | 12/1961 | Eolkin | 426/480 X |
| 3,063,840 | 11/1962 | Sullivan | 426/480 |
| 3,352,841 | 11/1967 | Lyon | 426/417 X |
| 3,780,191 | 12/1973 | Langer et al. | 426/231 |
| 4,137,335 | 1/1979 | Holm et al. | 426/480 X |
| 4,216,239 | 8/1980 | Gloppestad | 426/480 X |
| 4,335,146 | 6/1982 | Bladh | 426/417 X |
| 4,344,976 | 8/1982 | Bladh | 426/417 X |
| 4,504,515 | 3/1985 | Hohenester et al. | 426/641 |
| 4,680,183 | 7/1987 | van Schouwenburg | 426/646 |
| 4,778,682 | 10/1988 | Chapman | 426/248 |
| 4,844,922 | 7/1989 | Uemura et al. | 426/104 |
| 4,847,099 | 7/1989 | Elinsky | 426/233 |
| 4,876,103 | 10/1989 | Kawano et al. | 426/574 |
| 4,980,185 | 12/1990 | Small | 426/417 |
| 5,026,565 | 6/1991 | McLachlan et al. | 426/241 |

FOREIGN PATENT DOCUMENTS 463736  3/1950  Canada .

*Primary Examiner*—Arthur L. Corbin
*Attorney, Agent, or Firm*—Reinhart, Boerner, Van Deuren, Norris & Rieselbach

[57] ABSTRACT

A fractionation process for commercially producing low fat, low cholesterol, reduced calorie, natural and raw uncooked meat, fowl and seafood products. The process involves size reduction of the meat in the presence of water with ionic strength pH manipulation and fractionation of the meat into fatty materials, connective tissues and extremely low fat, low cholesterol meat particles. The resulting naturally defatted meat exhibits excellent eating and cooking characteristics, extended shelf life and is free from carcinogenic substances found in broiled high fat meat.

14 Claims, 1 Drawing Sheet

PROCESS FOR PRODUCING LOW FAT MEAT PRODUCTS

BACKGROUND OF THE INVENTION

The present invention relates generally to a method of producing a low fat meat product. More particularly, the invention relates to a method for the production of naturally defatted and decholesteroled raw meat to provide food Products with extremely low fat and low saturated fat, while also providing significantly reduced cholesterol and calories. The product exhibits enhanced taste and is free from chewiness and toughness normally associated with low fat meats, as well as having extended shelf life without rancidity and/or spoilage. Because the meats are substantially free from fat, the low fat meats cooked by broiling will be free from harmful mutagenic and/or carcinogenic compounds.

In recent years, a great deal of attention has been focused on the relationship between dietary total fat, saturated fat, and cholesterol intake on the one hand and the incidence of diseases of the blood vessels, such as coronary heart disease and arteriosclerosis, on the other hand. As a consequence of these studies and concerns, medical professionals have been advising the reduction of human consumption of animal fat. This suggestion has resulted in a decline of meat consumption, particularly red meat, which is known to contain high levels of saturated fat and cholesterol. The declined consumption of meat has adversely affected the meat industry resulting in economic losses. On the other hand, the consumption of poultry and fish products have been increasing because they contain less total fat, as well as less saturated fat and cholesterol than red meat.

The red meat industry has reacted to such consumption decline by recently introducing a low fat hamburger (10-13% fat) using more expensive leaner cuts and adding carrageenan and other moisture binders to sustain juiciness. Other products recently introduced includes a 4% fat lean ground beef product containing hydrolyzed oat fiber. Nevertheless, the fat and saturated fat levels in such meats are still high with regard to the currently recommended healthy dieting (the Surgeon General's recommendation is no more than 30% of calories from fat). Individuals with restricted diet requirements, as well as health-conscious consumers, can obtain only modest reductions of total fat and cholesterol intake. Furthermore, only expensive lean meats can be utilized, which in return make such products cost prohibitive for most consumers and further limit the consumption potential.

Numerous attempts have been undertaken to reduce the fat in red meat. Unfortunately, all approaches have revolved around reducing the fat only to high levels of approximately 10% or greater and have not reduced the fat, saturated fat and cholesterol into acceptable levels for health conscious consumers and individuals with restricted diet requirements.

Several processes have been developed to treat meats from various animal sources to reduce their fat content. These processes typically have concerned one or more of the following three approaches. First, the removal of fat from meat has been accomplished by mechanical means such as a crusher, a press or a cutting tool; and these means are exemplified by U.S. Pat. Nos. 4,776,063, 3,780,191, 3,748,148, 3,685,095, 3,078,287, 3,270,041 and 4,948,607; Japanese Patent Publications Nos. 62265396 (871118) and 61158763 (860718); French Pat. No. 2,187,229; and British Pat. No. 1179418. Second, treatments including heat, light, and reaction of gases with meats are represented by Japanese Patent Publication Nos. 62278967 (871203), 61058533 (860325), 59173070 (840929), 59084993 (840516) and 58187496 (831101); Soviet Union Publication Nos. 1153874 (850507), 627810 (780821), 502011 (76082) and 1318420 (690331); and U.S. Pat. Nos. 3,687,819, 3,780,075 and 3,532,593. Third, chemical treatments with water or strong chemical reagents are illustrated by Soviet Union Publication Nos. 1329737 (870815), 1063824 (831230) and 1017684 (830515); German Patent Publication Nos. 200156 (830323), 3169440 (850425) and 2119608 (710422); Japanese Patent Publication Nos. 56018537 (810221), 55156569 (801205), 54003099 (790111) and 52040473 (770329); and U.S. Pat. Nos. 3,794,743 and 3,532,593.

Some additives, such as food gels, have been utilized to produce low fat meat products (U.S. Pat. No. 4,844,922), or a Konjac Mannan gel (U.S. Pat. No. 4,876,103) and milk proteins (U.S. Pat. No. 4,504,515). U.S. Pat. No. 4,847,099 is directed to an apparatus for cooking meat in home and commercial kitchens by suspending the meat in a partially closed container above boiling water where the meat is exposed to steam.

A different method for reducing the cholesterol and saturated fat content of red meat and fowl is described in U.S. Pat. No. 4,980,185 which is directed to a heated unsaturated oil to solubilize the saturated fat and cholesterol of fragmented meat, then an aqueous fluid is used to separate and remove the extracting oil from the oil-processed meat. According to this patent, fat content was reduced from 20.8% to 18.5% (only an 11% reduction) and cholesterol was reduced from 115mg to 80mg of cholesterol per 100g beef (a 30% reduction). Both reductions are relatively insignificant and do not offer much advantage over trimming the extra fat manually. Other drawbacks are that the method produces pre-cooked meats, the product must be declared as imitation meats because they contain vegetable oil, and the caloric value will be as high as regular ground beef.

Another method for lowering the fat and cholesterol levels in meat is set forth in U.S. Pat. No. 4,778,682. In this patent, a thin layer of meat is exposed to ultraviolet light, then the meat is comminuted in a chilled bowl with the addition of iced water, edible acid, salt, and food phosphates until a quantity of fat and cholesterol separate from the meat emulsion and adhere to the inner surface of the cold bowl. The limitation of this invention is the impracticality of having to expose thin layers of meat to ultraviolet light for up to 12 hours. In addition, health hazards might be created by virtue of forming free radicals by exposing the meat to radiation.

U.S. Pat. No. 4,680,183 describes another example of using heat treatment in the production of low fat meat from cheaper cuts of meat. Furthermore, the process of the removal of sterols and/or lipid components from lipid containing food products using sub or super-critical fluids (e.g., carbon dioxide) is explained in U.S. Pat. No. 5,026,565. This patent describes food initially processed to produce an intermediate moisture product with substantially all of the free water, but not all of the bound water is removed to produce a moisture level between 30-55%. Such an intermediate product is treated with super-critical carbon dioxide to remove the lipid. The product can be treated with water and fat to provide a reconstituted meat product. Such chemical treatments are, however, considered undesirable for food products as a consequence of a recent report on the effect of sub or super-critical fluids on blood cholesterol. At the least, these products would be perceived by consumers as being artificial products. Canadian Patent No. 463,736 is directed to a process for defatting pork skins for gelatin manufacturing. The process involves coarse and fine grinding of pork skins which are subjected to dilution and flotation in water to remove the fat from animal tissues. These steps are followed by agitation in a moving current of air to produce a suitable base for gelatin manufacturing.

In another approach U.S. Pat. No. 3,780,191 describes a process for reducing the fat content of frozen meat by comminuting a frozen portion of meat and obtaining discrete frozen meat particles and discrete frozen fat particles, then upon the addition of water the particles are mechanically separated into reduced fat meat and fat particles. Such a process could reduce the visible fat in frozen meat into a level achievable by manual trimming of fats, but it does not remove the difficult to eliminate, intramuscular fat, or the fat-laden connective tissues and the cholesterol which is located in the cell membranes.

Despite all these innovations, the currently known procedures collectively remain ineffective for the purpose of substantially reducing total fat and cholesterol of meats, fowl, and sea foods. All of the available procedures typically involve the grinding or crushing of meat followed by chemical and physical extraction with hot water, steam, heat, pressure, or some combination of these treatments. One of the primary challenges remaining is the appreciable removal of cholesterol and total fats located in inaccessible components of the meat. Virtually all of the cholesterol in edible meats exists in the free form and is located in the membranes of the cell within the meat tissue rather than in the meat (muscle) itself. On the other hand, most of the fat exists in the adipose tissues wherein the fat is embedded in connective tissues. Intramuscular fat represents a good portion of marbling and is the most difficult to eliminate. However, neither cholesterol, fat nor saturated fat can be effectively extracted from edible meats and meat products simply by employing heat, water, or steam. Water and steam can be employed to melt some fats, which then can be physically removed in part. Nevertheless, these treatments cannot substantially extract the cholesterol or fat and saturated fats of meat, particularly in the case of red meats such as beef, pork and lamb.

Another challenge to the food technologist remains how to avoid the oxidation of unsaturated fat which results in alteration of flavor, taste, and texture upon storage and cooking and reheating. Until now, the industry resorted to the addition of antioxidants and chemicals to retard the oxidation. Such chemical additions are unappreciated by consumers in their diets. Therefore, it would be a natural solution to completely eliminate the fats and avoid the oxidation problems. Furthermore, the oxidation of unsaturated fatty acids in fish and seafood products relates to the short life and spoilage of such products. A natural defatting process would resolve such problems and extend the shelf life of food products.

The need for a commercial process for adding value to the less demanded high fat meats and low value fish has always been desired as well. In addition to the nutritional attributes of such low fat products, the organoleptic properties of the finished products could be greatly improved resulting in a significant profits for the industry.

Recent medical reports have also indicated that broiling or charcoal broiling of meat causes the fat to melt and drip onto the heat source. Such burning fat produces Benzo [a] Pyrene, which vaporizes and is deposited on the cooking meat. Benzo [a] Pyrene is a proven carcinogenic substance. Broiling leaner meats is useful in minimizing the formation of such carcinogenic substances (American Cancer Society, Carcinogenic Information Program, Inc., #2, August 1978). A logic solution for this crucial health threatening matter would be to naturally eliminate the fat from meat products.

It is, therefore, an object of the invention to provide an improved natural method for producing a low fat meat product.

It is another object of the invention to provide a novel method for producing a low fat red meat, fowl or fish product.

It is a further object of the invention to provide an improved meat product having low fat content and low cholesterol content.

It is an additional object of the invention to provide a new low fat meat product and method of manufacture wherein the resulting raw meat product has an extended shelf life.

It is yet another object of the invention to provide an improved low fat meat product and method of manufacture producing a meat product having intramuscular and connective tissue fat and intracellular cholesterol removed.

It is still a further object of the invention to provide a novel low fat meat product having substantially reduced oxidation tendencies.

It is yet an additional object of the invention to provide an improved low fat meat product free of chemical additives and free of fat constituents which could lead to production of carcinogenic substances.

It is still a further object of the invention to provide a novel method of producing high quality meat products from low quality starting meat products.

Other objects and features of the invention will be set forth in the detailed description, examples and claims and in the drawings described below:

SUMMARY OF THE INVENTION

The present invention provides methods for commercially producing low fat, low cholesterol and reduced calorie natural uncooked meat suitable for direct consumption. In addition, it has been found when meats are treated by the method of the present invention, they exhibit excellent organoleptic properties (texture, taste, and flavor), as well as maintaining more juiciness and less shrinkage during cooking. It is a further aspect of the present invention to produce meats with extended shelf life when refrigerated or frozen as compared to conventional meats. It is another object of the present invention to produce meats which show no deterioration of the flavor upon reheating or repreparation and not undergoing any degree of fat oxidation.

In one broad aspect of the present invention, there is provided a method for fractionating meats into (1) fatty materials, (2) connective tissues and (3) extremely low fat, low cholesterol meats suitable for various dietary needs. The present invention seeks to substantially overcome the problem of fat and cholesterol present in the meat beyond conventional trimming or rendering processes used with either raw or cooked meats.

The present process produces reduced fat and cholesterol meats in uncooked and raw status suitable for direct consumption as well as prepared dishes and frozen meals. Furthermore, the reduced pH featured in the process results in significantly increasing the stability, extending shelf life and reducing health hazards and sickness associated with refrigerated meats.

DETAILED DESCRIPTION OF PREFERRED EMBODIMENTS

In the present invention the term "meat" shall include, without limitation, all edible meats, such as, for example, beef, pork, lamb, buffalo, deer, chicken, turkey, hens, ducks, fish, shrimp, shellfish, and the like.

Figure 1:
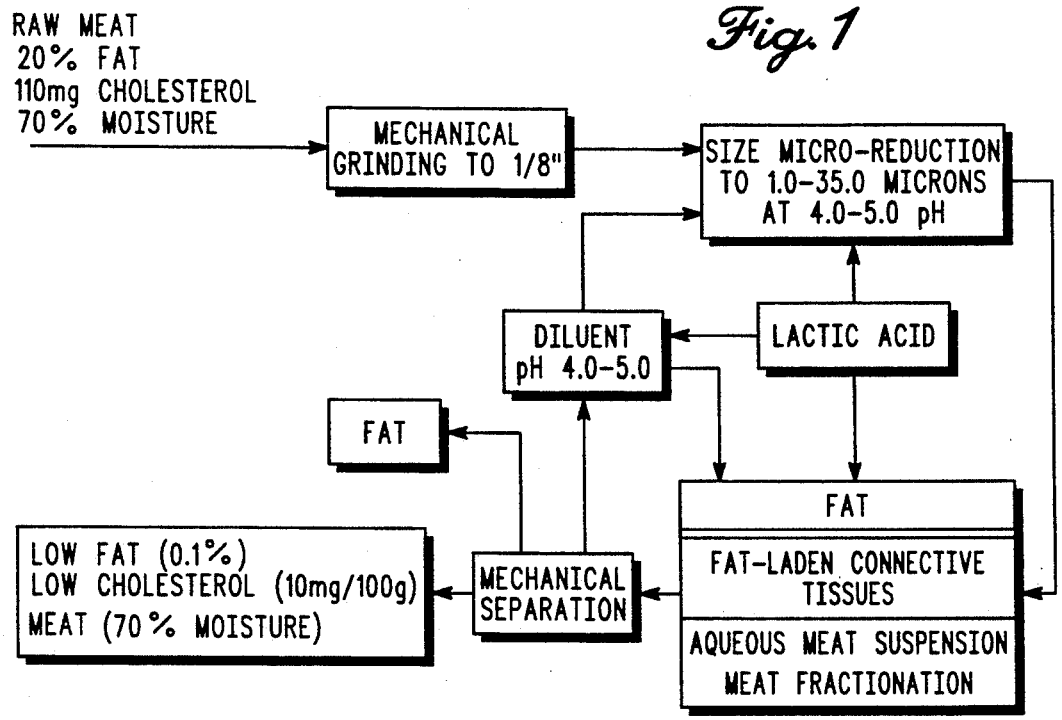
FIG. 1 is a flow diagram schematically showing preferred method of making low fat meat products.

Referring to the flow diagram of FIG. 1, the first step in the invention is the size reduction, including micro-reduction, of the size of the meat. In the case of the illustrated beef red meat, the size is approximately between roughly 0.5-40 microns utilizing a size disintegrator manufactured by Stephan Corp. (Stephan Universal Machine Type VCM-12) with sharp cutting knives in the presence of water (preferably a 1:1 ratio but can range over wide ratios). The purpose of this step is to disintegrate connective tissues, adipose tissues, fats, cell membranes and proteins and increase the surface area to release various types of fats and cholesterol and provide a modified meat suspension. The precise size range suitable to cause disintegration can, of course, vary depending on the type of meat (beef, lamb, fish, poultry) and even the particular structure of any one individual animal s fat structure (arising from, e.g., diet or breeding).

It is important to avoid re-emulsifying the fats and to use a disintegrator adequate to result in the tissues and cells being substantially disrupted. In the process the fat and cholesterol are thrown away from the center of the vessel containing the meat suspension by the action of the rotation of the vessel. This step prevents re-emulsification of the fats. The above-referenced Stephan Universal Machine type VCM-12 also includes the ability to centrifuge the modified meat suspension. Another purpose of this step is to tenderize the collagen and connective tissues in order to produce a smooth consistency and reduce chewiness and toughness in the finished product. This step also facilitates the acidification step to be described hereinafter.

It was found during experimentation that, if the size micro-reduction is performed in the absence of water, the fat and cholesterol removal from meats and from fat-laden connective tissues is incomplete. On the other hand, excessive water addition dilutes the product and reduces the exposure of the meat to the cutting action of the knives The temperature of this step is generally irrelevant as long as the mixture is in the liquid state. The process could be preformed between about 30°-100° F., and most preferably about 60° F.

Figure 2:
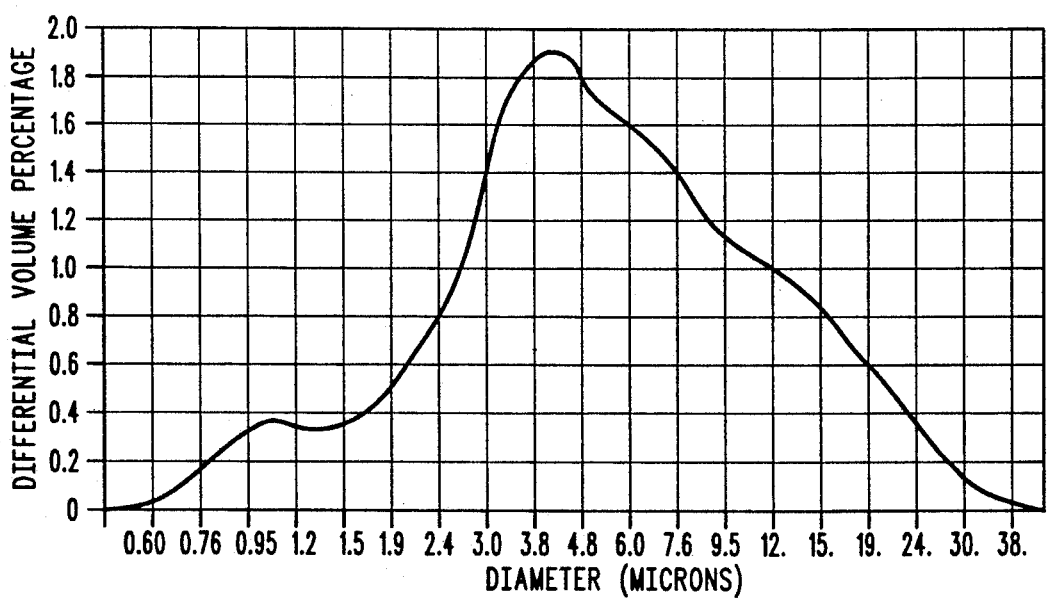
FIG. 2 illustrates a preferred particle size distribution for a disintegrated red meat.

In a preferred method and product the resulting particle size after micro-reduction is shown in FIG. 2 and Tables 1 and 2. The final size is about 0.6-40 microns diameter with a mean size of about 5.24 microns. Adequate disintegration for purposes of the removal of fat leads to a particle size of less than about 200-300 microns.

TABLE I

| Geometric Mean size: | 5.239 um | PERCENTILES |
|---|---|---|
| Geom. Std Deviation: | 2.196 um | 0.100% Volume above 34.04 um |
| Geom. Skewness: | 0.378 | 1.000% Volume above 26.69 um |
| Geom. Coeff Variation: | 41.92 | 6.000% Volume above 18.02 um |
| | | 22.00% Volume above 9.908 um |
| Arithmetic Mean Size: | 7.022 um | 50.00% Volume above 5.147 um |
| Median Size: | 5.048 um | 78.00% Volume above 3.032 um |
| Mode Size: | 4.410 um | 94.00% Volume above 1.336 um |
| Kurtosis: | 3.452 | 99.00% Volume above 0.800 um |
| Arith Std Deviation | 5.912 um | 99.90% Volume above 0.621 um |

TABLE II

Volume Distribution Data
Total Volume: 39409121

| Channel | Size | Volume Relative to Total Volume | Cumulative Volume percent |
|---|---|---|---|
| 1 | 0.532 | 0 | 100.0 |
| 2 | 0.550 | 5371 | 100.0 |
| 3 | 0.569 | 7648 | 100.0 |
| 4 | 0.589 | 10673 | 100.0 |
| 5 | 0.609 | 13824 | 99.9 |
| 6 | 0.630 | 19563 | 99.9 |
| 7 | 0.652 | 25695 | 99.8 |
| 8 | 0.674 | 33074 | 99.7 |
| 9 | 0.697 | 41721 | 99.7 |
| 10 | 0.721 | 51576 | 99.5 |
| 11 | 0.746 | 62621 | 99.4 |
| 12 | 0.772 | 72058 | 99.2 |
| 13 | 0.798 | 83437 | 99.0 |
| 14 | 0.825 | 98065 | 98.8 |
| 15 | 0.854 | 105281 | 98.5 |
| 16 | 0.883 | 112638 | 98.3 |
| 17 | 0.914 | 119963 | 98.0 |
| 18 | 0.945 | 127836 | 97.6 |
| 19 | 0.977 | 135889 | 97.3 |
| 20 | 1.011 | 141584 | 97.0 |
| 21 | 1.046 | 144994 | 96.6 |
| 22 | 1.082 | 144018 | 96.2 |
| 23 | 1.119 | 143782 | 95.9 |
| 24 | 1.157 | 142676 | 95.5 |
| 25 | 1.197 | 141442 | 95.1 |
| 26 | 1.238 | 138364 | 94.8 |
| 27 | 1.281 | 135729 | 94.4 |
| 28 | 1.325 | 134789 | 94.1 |
| 29 | 1.370 | 132996 | 93.8 |
| 30 | 1.418 | 131466 | 93.4 |
| 31 | 1.466 | 132894 | 93.1 |
| 32 | 1.517 | 135905 | 92.7 |
| 33 | 1.569 | 138664 | 92.4 |
| 34 | 1.623 | 145501 | 92.0 |
| 35 | 1.678 | 149336 | 91.7 |
| 36 | 1.736 | 157963 | 91.3 |
| 37 | 1.796 | 172006 | 90.9 |
| 38 | 1.858 | 179075 | 90.4 |
| 39 | 1.921 | 194848 | 89.9 |
| 40 | 1.987 | 214559 | 89.4 |
| 41 | 2.056 | 234804 | 88.8 |
| 42 | 2.126 | 243464 | 88.2 |
| 43 | 2.200 | 263049 | 87.6 |
| 44 | 2.275 | 291334 | 86.9 |
| 45 | 2.353 | 319559 | 86.1 |
| 46 | 2.434 | 338167 | 85.3 |
| 47 | 2.518 | 370259 | 84.4 |
| 48 | 2.604 | 397818 | 83.4 |
| 49 | 2.694 | 419926 | 82.4 |
| 50 | 2.787 | 464472 | 81.2 |
| 51 | 2.882 | 515659 | 80.0 |
| 52 | 2.981 | 531505 | 78.7 |
| 53 | 3.084 | 559402 | 77.3 |
| 54 | 3.190 | 610704 | 75.8 |
| 55 | 3.299 | 650240 | 74.2 |
| 56 | 3.413 | 679705 | 72.5 |
| 57 | 3.530 | 703894 | 70.8 |
| 58 | 3.652 | 718956 | 69.0 |

TABLE II-continued

Volume Distribution Data
Total Volume: 39409121

| Channel | Size | Volume Relative to Total Volume | Cumulative Volume percent |
|---|---|---|---|
| 59 | 3.777 | 732028 | 67.1 |
| 60 | 3.907 | 739928 | 65.3 |
| 61 | 4.041 | 748849 | 63.4 |
| 62 | 4.180 | 750034 | 61.5 |
| 63 | 4.324 | 749254 | 59.6 |
| 64 | 4.472 | 753011 | 57.7 |
| 65 | 4.626 | 730605 | 55.8 |
| 66 | 4.785 | 722469 | 53.9 |
| 67 | 4.950 | 707677 | 51.2 |
| 68 | 5.120 | 707000 | 50.3 |
| 69 | 5.296 | 700169 | 48.5 |
| 70 | 5.478 | 678691 | 46.8 |
| 71 | 5.666 | 666037 | 45.1 |
| 72 | 5.861 | 662094 | 43.4 |
| 73 | 6.062 | 638789 | 41.7 |
| 74 | 6.271 | 617183 | 40.1 |
| 75 | 6.486 | 606612 | 38.6 |
| 76 | 6.709 | 603677 | 37.1 |
| 77 | 6.940 | 594500 | 35.5 |
| 78 | 7.178 | 574588 | 34.1 |
| 79 | 7.425 | 555349 | 32.6 |
| 80 | 7.680 | 544786 | 31.2 |
| 81 | 7.944 | 525944 | 29.9 |
| 82 | 8.217 | 502702 | 28.6 |
| 83 | 8.499 | 483902 | 27.3 |
| 84 | 8.792 | 470668 | 26.1 |
| 85 | 9.094 | 461300 | 24.9 |
| 86 | 9.406 | 454417 | 23.8 |
| 87 | 9.730 | 447496 | 22.6 |
| 88 | 10.06 | 441184 | 21.5 |
| 89 | 10.41 | 431725 | 20.4 |
| 90 | 10.77 | 418299 | 19.3 |
| 91 | 11.14 | 408630 | 18.2 |
| 92 | 11.52 | 398891 | 17.2 |
| 93 | 11.92 | 395122 | 16.2 |
| 94 | 12.33 | 375406 | 15.2 |
| 95 | 12.75 | 370279 | 14.3 |
| 96 | 13.19 | 360593 | 13.4 |
| 97 | 13.64 | 355649 | 12.5 |
| 98 | 14.11 | 351917 | 11.6 |
| 99 | 14.60 | 340970 | 10.7 |
| 100 | 15.10 | 321022 | 9.84 |
| 101 | 15.62 | 301656 | 9.05 |
| 102 | 16.15 | 295328 | 8.29 |
| 103 | 16.71 | 285593 | 7.56 |
| 104 | 17.28 | 271651 | 6.85 |
| 105 | 17.88 | 263931 | 6.17 |
| 106 | 18.49 | 240908 | 5.53 |
| 107 | 19.13 | 225626 | 4.94 |
| 108 | 19.78 | 212050 | 4.38 |
| 109 | 20.46 | 198002 | 3.86 |
| 110 | 21.17 | 186120 | 3.37 |
| 111 | 21.89 | 171861 | 2.92 |
| 112 | 22.65 | 154247 | 2.51 |
| 113 | 23.43 | 142682 | 2.13 |
| 114 | 24.23 | 125300 | 1.79 |
| 115 | 25.06 | 112640 | 1.49 |
| 116 | 25.93 | 103707 | 1.21 |
| 117 | 26.82 | 86484 | 0.97 |
| 118 | 27.74 | 77069 | 0.76 |
| 119 | 28.69 | 64793 | 0.58 |
| 120 | 29.68 | 49409 | 0.44 |
| 121 | 30.70 | 39978 | 0.33 |
| 122 | 31.75 | 30543 | 0.24 |
| 123 | 32.84 | 26456 | 0.16 |
| 124 | 33.97 | 20480 | 0.10 |
| 125 | 35.14 | 16384 | 0.06 |
| 126 | 36.35 | 10240 | 0.02 |
| 127 | 37.60 | 4096 | 0.01 |
| 128 | 38.89 | 0 | 0.00 |

Another feature of the preferred form of the invention is the addition of feed grade acid to the water mixture to reduce the pH of the modified meat suspension to a pH of roughly 4.0–5.0. Reduction of the pH into the acidic range controls the microbiological environment and suppresses the growth of any spoilage microorganisma (i.e., pseudomonads and related Gram-negative organisma) in addition to microorganisms that might produce toxins (i.e., *Clostridium botulinum*) and restrict the growth of foodborne pathogens (i.e.. *Salmonella, Stophylococcus aurous, Listeria monocytogens*).

Any food grade acids can provide the necessary pH reduction. Organic acids such as acetic, adipic, citric, malic, lactic, succinic, and tartaric, glucono delta-lacton acids, and any inorganic acids such as phosphoric, sulfuric and hydrochloride acids can also be used. While acids such as ascorbic, benzoic, erythorbic, propionic and sorbic can be used, the expenses may be somewhat prohibitive for quantities needed to achieve the proper acidification. The most preferred acid is lactic acid which is used in an amount sufficient to suppress the pH and to modify the ionic strength of the modified meat suspension. Without limitation on the scope of the invention, it is believed the ionic strength is affected by chelating some of the divalent metal ions that exist in the meat structure. Furthermore, since overall protein structure is negatively charged, acid provides positive ions which react with the negative ions of the meat and bring the pH close to the isoelectric point of proteins, thereby aiding in releasing fats and cholesterol from intramuscular proteins and connective tissues. This mechanism is contrary to other patents and known processes which utilize buffering salts to solubilize the proteins, increase ionic strength and increase pH of meat. Such buffering salts were found to be detrimental to this process in terms of producing excessive amounts of connective tissues which accumulate during agitation and processing and could bind the fat and hinder fat removal.

After pH reduction, the size micro-reduced modified meat suspension is then transferred into a processing tank where sufficient amounts of water (pH of roughly $4 \geq 5$) are added in the ratio of 2–15 times the weight of meat being processed.

Surprisingly, it was found that the combination of such high volume of water and acid at a pH of approximately 4.0–4.3 caused the connective tissues to gelatinize at very low temperatures. These conditions then cause the release of all the entrapped fat as well as intramuscular fat and cholesterol which remains suspended in the liquid medium (and can be recovered during mechanical separation afterwards). Furthermore, the gelatinized treated connective tissues yielded unexpectedly smooth meat completely free from chewiness and toughness associated with conventional "low fat" meats. The addition of water transforms the modified meat suspension into an aqueous meat suspension which is capable of being fractionated and separated during centrifugation. Adding water at such levels is particularly useful in releasing fat and cholesterol from cell membranes, reducing the viscosity of the aqueous meat suspension and enhancing the separation and fractionation of fat, cholesterol and fat-laden connective tissues. In addition, the water creates a density gradient for further fractionation. As mentioned herein before, the processing pH of the water-based mixture provides a safe environment for processing meat that is inhibitory for the proliferation of spoilage microorganisms as well as toxin-forming/ and illness causing microorganisms. Such microbiologically inhospitable pH is a significant factor in extending the shelf life of refrigerated meats at the grocery supermarket level.

The aqueous meat suspension is exposed to centrifugation in either a decanter and preferably in a high speed centrifuge (both are commercially available). Centrifugation separates fat and fat-laden connective tissue from the meat portion to produce substantially fat and cholesterol reduced raw meat with optimizable moisture. It should be noticed that because of the processing parameters and fluidity of the method of the present invention, the aqueous meat suspension is suitable for passage through a disc centrifuge (which requires very low solids level) for further separation of fat, fat-laden connective tissues and cholesterol from high protein meat.

The finished dry meat portion can be further processed by the addition of ingredients to retain the juiciness during cooking. Also, natural flavors could be added to produce a range of flavored meats suitable for numerous applications. Water removed form the aqueous meat suspension can be recycled a s a diluent in the aqueous meat suspension for virtually unlimited cycles.

Development of oxidative rancidity has long been recognized as a serious problem during the holding or storage of meat products for subsequent consumption (American Meat Institute, 1944). Rancidity in meat products begins to develop soon after death of the animal and continues to increase rapidly until the product becomes unacceptable to consumers (because of deterioration of taste and appearance). Although freezing is generally recognized as one of the best methods for preservation, oxidation can continue even at relatively low temperatures. Furthermore, warmed-over flavor of meat products is a form of oxidative rancidity that develops in a few days in contrast to common rancidity that requires longer time to develop. Although warm-over flavors can develop even in fresh meat, it most commonly occurs in meats that are cooked or in which the membranes are broken down by processes such as grinding. In general, any process that disrupts the integrity of the membranes enhances the development of warm-over flavors. Therefore, restructured meats are particularly vulnerable to warmed-over flavors because the membranes are subjected to destruction both by the process of restructuring and/or pre-cooking. According to the present invention, by eliminating the saturated fat, the shelf life is extended dramatically, while taste and flavor are preserved for much longer times than for conventional meat products. Such enhanced eating qualities of cooked and prepared meals, (e.g., frozen T.V. dinners) eliminated the need for using antioxidants in processed and cold meats, thus meeting the expectations of health conscious consumers who require less preservative be used in food processing.

EXAMPLES

The present invention will be further described by reference to the following nonlimiting examples which do not restrict the scope of the present invention to ingredients, experimental designs, processing parameters or the illustrated data:

EXAMPLE (1)

Fifty pounds of beef (18–20% fat content) was ground in a standard meat grinder. Five pounds of the ground meat were mixed with five pounds of tap water (at about 50°–60° F.), subjected to size micro-reduction utilizing a Stephan Universal Machine type VCM-12 to produce a modified meat suspension. About 100 lbs. of the modified meat suspension were mixed uniformly with 450 lbs. of tap water (50°–60° F.) in a 500-lb. processor to form an aqueous meat suspension with a pH of 6.0 (normal meat pH). Immediately upon agitation, fat entities and fat-laden connective tissues floated onto the surface of the processor and were skimmed off. Upon continuous agitation, fat entities and fat-laden connective tissues kept floating to the surface and were skimmed until most of which were removed. A part of connective tissues kept agglomerating around the agitator shaft and then were collected out of the processor. The aqueous meat suspension was left undisturbed for half an hour and then the water removed form the surface and high moisture meat free from connective tissues was recovered. The resulting meat had a fat content between about 0.5–1.0%.

EXAMPLE (2)

The same procedures as Example 1 were followed, except after skimming the fat entities and fat-laden connective tissues, the aqueous meat suspension was passed through a two-phase decanter (Model NX-409, Alfa Laval Group Indianapolis, Indiana) to reduce the moisture content to 68–74%. Meat was discharged from a separate port while water, including fat entities and fat-laden connective tissues, were discharged from a different port. The fat content of the meat product was 0.3 to 0.5%. Upon cooking, this meat was somewhat chewy primarily due to the high pH of fractionation and incomplete modification of the connective tissues.

EXAMPLE (3)

The same procedures as Example 2 were followed except lactic acid was added to water before size micro-reduction (pH of about 4.2–4.7) and/or during forming the aqueous meat suspension to obtain a pH of roughly 4.1–4.7 throughout the fractionation process. The connective tissues did not agglomerate around the agitator shaft and were uniformly suspended. The resulting meat was exceptionally tender upon cooking and contained 0–0.1% fat.

EXAMPLE (4)

The same procedures as Example 3 were followed except a three-phase centrifuge Aqueous Decanter (Model NX-409, Alfa Laval Group Indianapolis, Indiana) was used to separate water, meat and fat entities mixed with fat-laden connective tissues. The resulting meat product was virtually free of detectable fat.

EXAMPLE (5)

The same procedures as Example 3 were followed except lactic acid producing bacteria were propagated in a growth, promoting cultivation media of various pH's. These low pH media were added at levels of 5–70% of the aqueous meat suspension to achieve a pH of about 4.2–5.0.

EXAMPLE (6)

The same procedures as Example 3 were followed but, a solids-ejecting separator (Model AFPX513 XGD, Alfa Laval Indianapolis, Indiana) was used to separate the liquid and fat entities from the meat. The resulting meat had a fat level of 0–0.1%.

EXAMPLE (7)

Fat entities and fat-laden connective tissues from Example 1 were recovered manually. The fat content of such by-products were between 30–34% for the fat entities and 1-3% for the connective tissues. Upon heating the combined fat entities and connective tissues to 170°-210° F., the fats separated out. A three-phase decanter was utilized to separate water, melted fat (99% fat suitable for resale as a tallow) and a cooked low fat meat (0-4% fat) which could be sold as a meat product for food service outlets or added back to the raw meat portion to help reduce the cost of the finished raw meat product.

EXAMPLE (8)

Low fat or fat free meats resulting from Example 3 were subjected to centrifugal size micro-reduction as in Example 1 to reduce the meat particle size for a second time to achieve a size of about 1.0-100 microns. This step was followed by another liquid addition with agitation, then the mixture was passed through a decanter to remove any traces of fat left in the meat product.

EXAMPLE (9)

The same procedures as Examples 2 and 3 were followed to process a fowl meat either from chicken or turkey (fat content 10-19%) to produce low fat fowl meats (0.0-0.2%).

EXAMPLE (10)

The same procedures utilized in Examples 2 and 3 were followed to treat a mixture of fish meats (catfish, perch, salmon of about 10-20% fat) to produce low fat fish and seafood meats (0.0-0.2% fat).

EXAMPLE (11)

The same procedures as Example 10 were followed to reduce cholesterol content of a mixture of ground shrimp and crab meat. Cholesterol reduction of approximately 85-95% was achieved.

What is claimed is:

1. A process for producing low fat, low cholesterol raw uncooked meats comprising the steps of:
   (a) reducing the size of a starting meat in the presence of water to a particle size range causing disintegration of connective tissues, adipose tissues, fats and cell membranes in the meat;
   (b) adjusting the amount of water present with the size reduced starting meat such that the water content is between about 2 to 15 times the weight of the meat to form an aqueous meat suspension;
   (c) skimming the fat and fat-laden connective tissues from said aqueous meat suspension, said aqueous meat suspension having a pH controlled to be about 4.0 to about 5.0; and
   (d) mechanically separating fat and fat-laden connective tissues from said aqueous meat suspension.

2. The method as defined in claim 1 wherein the size reduction is performed at a pH of about 4.2-4.7.

3. A method for processing inexpensive high fat meats, comprising the steps of:
   (a) reducing the size of a starting meat in the presence of water to particle sizes in the range of about 0.6-300 microns.
   (b) controlling the pH of said water present with said meat to be in the range of about 4.0 to 5.0 and forming an aqueous suspension of said meat; and
   (c) mechanically separating fat-containing tissue from said aqueous meat suspension.

4. The method as defined in claim 3 wherein said water in the aqueous meat suspension is about 2 to 15 times the weight of said starting meat.

5. The method as defined in claim 3 wherein step (b) includes the step of adding an acid to said aqueous meat suspension in order to control the pH.

6. A process for producing a low fat, low cholesterol raw, uncooked meat, comprising the steps of:
   (a) reducing the size of a starting meat in the presence of water to a particle size range causing disintegration and release of connective meat tissue, adipose tissue, fats and cell membranes in the meat;
   (b) adjusting the amount of water present with said size reduced starting meat to form an aqueous meat suspension and controlling the pH of said aqueous meat suspension to be about 4.0-5.0; and
   (c) removing fat and fat laden tissues from said aqueous meat suspension.

7. The method as defined in claim 6 wherein the reduced size of said starting meat is about 0.5-300 microns.

8. The method as defined in claim 6 wherein said size reduced starting meat comprises about 3-5 percent by weight of said aqueous meat suspension.

9. The method as defined in claim 6 further including the step of skimming fat from said aqueous meat suspension.

10. The method as defined in claim 6 wherein the pH is controlled by the step of adding a food grade acid to said aqueous meat suspension.

11. The method as defined in claim 10 wherein said food grade acid is selected from the group consisting of lactic acid, ascorbic acid, citric acid, adipic acid, tartaric acid, acetic acid, malic acid, succinic acid, and inorganic acids.

12. The method as defined in claim 11 wherein said water in step (a) is added in the ratio of about 0.25:1.0 to 5:1 for water to meat weight percentages.

13. A method for producing a low fat, low cholesterol, reduced calorie, raw meat with extended shelf life comprising the steps of:
   (a) reducing the size of a starting meat in the presence of water to a particle size range causing disintegration of connective tissues, adipose tissues, fats and cell membranes in the meat;
   (b) adding water to the size reduced starting meat and water in an amount of about 0.5-5 times the weight of the starting meat to form an aqueous meat suspension and reducing the pH of said aqueous meat suspension to about 4.0 to 5.0; and
   (c) separating fat and food laden connective tissues from said aqueous meat suspension.

14. The method as defined in claim 13 wherein the pH of said aqueous meat suspension is controlled by adding a food grade acid to said starting meat the size reducing step and/or to said aqueous meat suspension.

* * * * *

UNITED STATES PATENT AND TRADEMARK OFFICE
CERTIFICATE OF CORRECTION

PATENT NO. : 5,167,977
DATED : December 1, 1992
INVENTOR(S) : Aly Gamay

It is certified that error appears in the above-identified patent and that said Letters Patent is hereby corrected as shown below:

Column 5, Line 60,      after "knives" insert -- a period (.) --;

Column 7, Line 13,      cancel "51.2" and insert -- 52.1 --;

Column 8, Line 39,      cancel "4 $\geqq$ 5" and insert -- 4-5 --;

Column 12, Line 60,      after "meat" insert -- during --.

Signed and Sealed this

Twenty-fourth Day of May, 1994

Attest:

BRUCE LEHMAN

*Attesting Officer*      *Commissioner of Patents and Trademarks*